Figure 3:
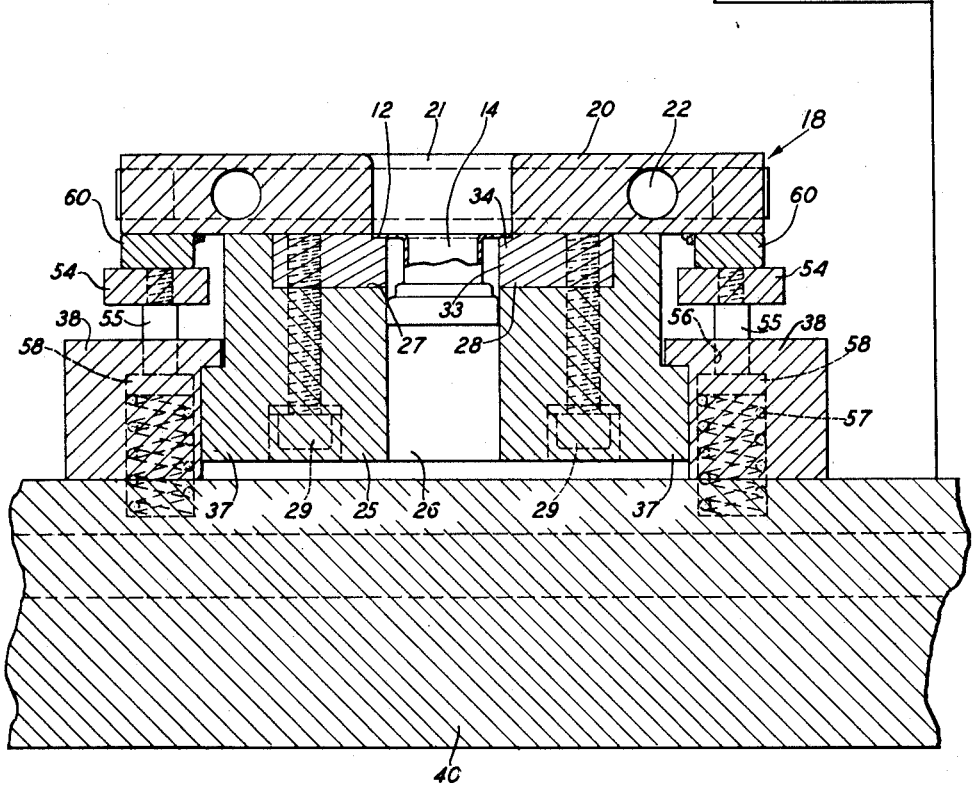

July 31, 1945.  V. G. JARMAN  2,380,529
WELDING APPARATUS
Filed Jan. 7, 1944  2 Sheets-Sheet 1
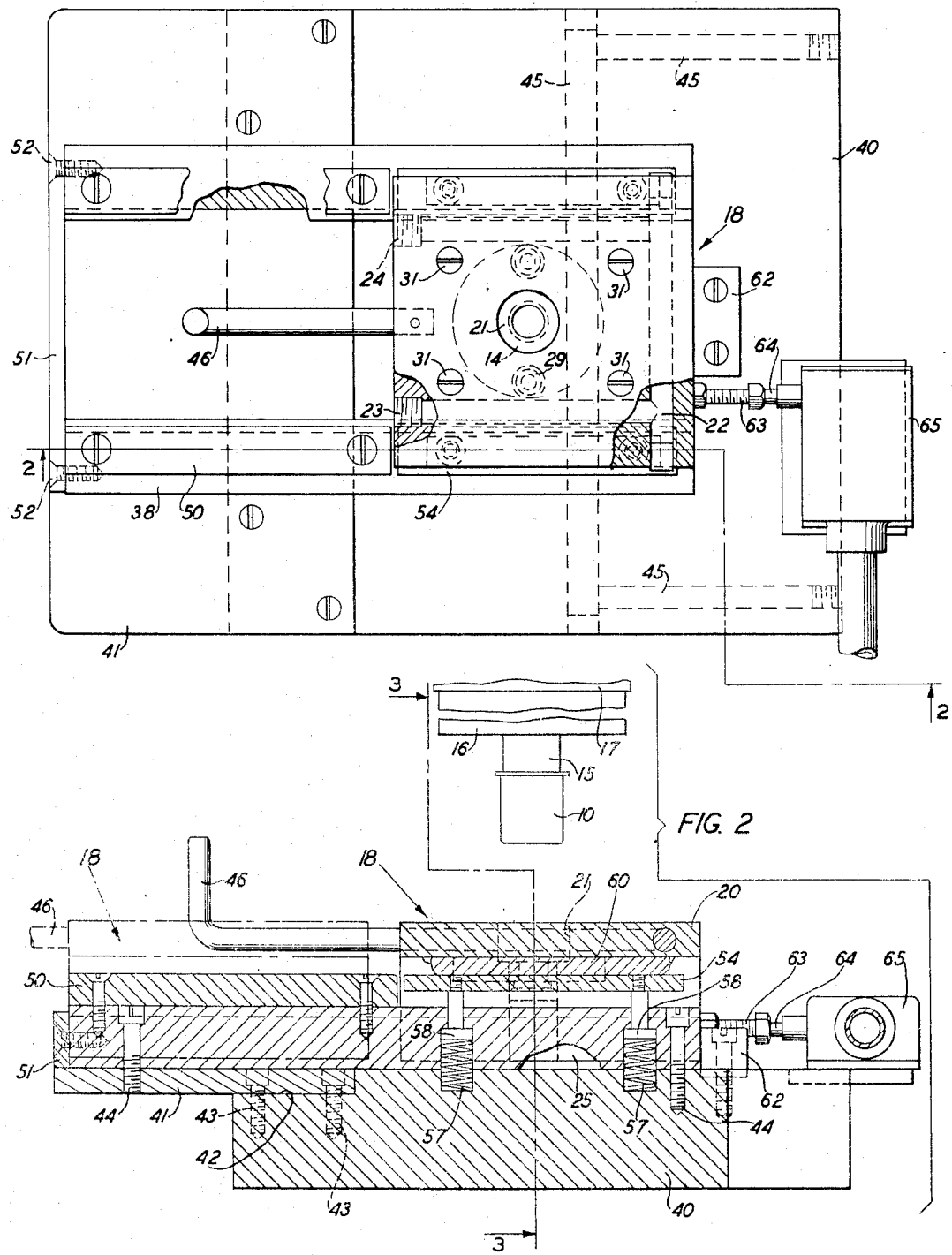
INVENTOR
V. G. JARMAN
BY
E. R. Nowlan
ATTORNEY Patented July 31, 1945

2,380,529

UNITED STATES PATENT OFFICE 2,380,529

WELDING APPARATUS

Vincent G. Jarman, Watchung, N. J., assignor to Western Electric Company, Incorporated, New York, N. Y., a corporation of New York Application January 7, 1944, Serial No. 517,347

3 Claims. (Cl. 219—4)

This invention relates to welding apparatus, and more particularly to those employing slidable electrodes.

In certain types of welding apparatus, it is customary for one of the electrodes or a portion thereof to be moved out of alignment with its companion electrode to receive parts to be assembled through welding. In such instances it has been the tendency sometimes for the movable electrode to pick up foreign particles in its movement which might disturb the electrical path between it and its associated parts.

An object of the invention is to provide a simple, efficient and highly practical welding apparatus.

With this and other objects in view, the invention comprises a welding apparatus wherein an electrode formed to receive an article is supported for transverse movement relative to its companion electrode free from a conductive member until disposed in the welding position.

Other objects and advantages will be apparent from the following detailed description when considered in conjunction with the accompanying drawings, wherein Fig. 1 is a top plan view of the lower portion of the welding apparatus, portions thereof being broken away;

Fig. 2 is a vertical sectional view taken substantially along the line 2—2 of Fig. 1, and Fig. 3 is an enlarged vertical sectional view taken substantially along the line 3—3 of Fig. 2.

Referring now to the drawings, let it first be understood that the complete welding apparatus is not disclosed therein, only those parts which are necessary to illustrate the invention being shown. First attention is directed to the articles to be welded. There is an upper article 10 cylindrical in general contour but having an annular portion 11 adjacent the closed end thereof which is to be welded throughout its circular contour to an annular flange 12 of an article 14. These articles are to constitute portions of a vacuum tube and it is most important that they be welded completely throughout the circular area of the portion 11, where it engages the flange 12, to form an air-tight connection. The article 10 is in the present illustration shown in Figs. 2 and 3 slidably disposed upon an upper electrode 15 and he. there by the frictional contact of the engaging surfaces of the article and electrode. The upper electrode 15 will hereinafter be termed a reciprocable electrode, having a head portion 16 supported by a unit 17, the latter being reciprocated in a vertical path between given limits by suitable means (not shown).

The article 14 is received in a lower electrode unit indicated generally at 18. This unit includes a head portion 20 with a central aperture 21, to receive the article 14, and fluid passageways 22 extending in different directions therethrough, with an inlet 23 and an outlet 24 for connection with a fluid circulating system (not shown). An electrode 25, centrally apertured at 26 to receive the article 14, is formed of a suitable conductive material, preferably copper, provided with a silver coating. The electrode 25 has an annular recess 27 in the upper face thereof to receive an annular conductive member 28 and is secured thereto by suitable means, such as screws 29. The member 28 in turn is fixed to the head portion 20 through the aid of screws 31, as shown in Fig. 1. It will be noted that the annular member 28 has a central aperture 33 disposed in alignment with the apertures 21 and 26 to receive the article 14, the member also having a recess 34, annular in contour, to support the flange 12 of the article 14.

The electrode 25 has tongue-shaped projections 37 at opposing sides thereof for interengagement with guides 38. The guides 38 are supported by a base 40 and a table 41 (Fig. 1 and 2), the latter projecting forwardly or to the left from a recessed portion 42 of the base in which the inner end of the table is disposed and secured in place by means of screws 43. The securing means for the guides includes screws 44. Through the aid of the guides 38, the electrode unit 18 may be moved into two positions, namely the welding position shown in solid lines in all of the figures or the loading position shown in dot and dash lines in Fig. 2. The base 40 is formed of a suitable conductive material, preferably copper, with its upper surface coated with silver and including passageways 45 therein for the circulation of a cooling fluid.

Through the aid of a handle 46, the unit 18 may be moved into either of the positions shown, namely the loading position, where it receives the article 14, or into the welding position, where the article 10 is to be welded to the article 14. It is important during this movement that the electrode 25, particularly the under surface thereof, be held free of engagement or contact with the other parts, where it may pick up foreign matter which might obstruct a free electrical path between the electrode and the base 40 during the welding operation. To accomplish this result, supporting rails are disposed upon each side of the electrode above the guides 38. At the loading position, fixed or stationary rails 50 are mounted upon the guides 38. While in this position, a removable but normally fixed stop 51, having its ends secured as at 52 to the guides 38, limits the forward movement of the unit 18.

Movable rails 54, supported by spring pressed elements 55, are disposed upon each side of the electrode 25 with their upper surfaces normally lying in a common plane with the upper surfaces of the fixed rails 50. The elements 55 are movably disposed in apertures 56 and are normally urged upwardly by springs 57. The springs 57 are housed in apertures in the guides 38 and the base 40, as illustrated in Figs. 2 and 3. The shoulders or head portions 58 of the elements 55 limit the upward movement of the rails 54 to maintain the normal alignment of their upper surfaces with those of the fixed rails 50. In the present illustration the head portion 20 of the unit 18 is provided with runners 60 fixed thereto by suitable means such as welding. If desired, other supporting means may be provided.

Through the aid of a stop 62, the unit 18 is located with the center line of the article receiving apertures thereof in alignment with the center line of the electrode 15. Also, an adjustable screw 63 is carried by the unit 18 to actuate a plunger 64 of a micro-switch 65. The switch 65 is included in a welding circuit indicated generally at 68. The welding circuit is shown schematically in Fig. 3, including a transformer 69 with a secondary winding 70 thereof electrically connected to the electrode 15, or the head 16 thereof, and the base 40. A primary winding 71 of the transformer 69 is included in a circuit extending from line 72 through a manually operable switch 73, a unit 74 including other desired control means for the circuit, the micro-switch 65 when closed, the winding 71, to line 75.

Considering now the operation of the welding apparatus, let it be assumed that the unit 18 is in the loading position shown in dot and dash lines in Fig. 2. When in this position the article 14 is dropped through the aperture 21, where it comes to rest with the flange portion 12 in the recess 34. The article 10 is disposed upon the electrode 15, after which, through the aid of the handle 46, the unit 18 is moved to the welding position. During this movement of the unit 18, the lower surface of the electrode 25 is held free of the table 41 and the base 40 by the runners 60 riding upon the rails 50 and 54. In the welding position the unit 18 is held, through the aid of the handle 46, against the stop 62 to hold the switch 65 actuated by the screw 63 engaging the plunger 64. Suitable mechanism (not shown) may be set in operation to cause downward movement of the electrode 15 to move the article 10 into the aperture 21, where the portion 11 thereof will engage the flange 12 of the article 14. During further movement of the reciprocable element 15, the unit 18 is moved downwardly against the force of the spring 57, moving with it the rails 54 until the electrode 25 engages under sufficient pressure the adjacent surface of the base 40. At this time the electrode 25 is included positively in the circuit with the secondary coil 70 of the transformer 69. For the purpose of illustration, let it be assumed that the switch 65 has been closed and that the mechanism in the unit 74 will control the closing of the welding circuit at a suitable time after the switch 65 has been closed and will also limit the length of time the welding circuit remains closed. The details of the unit 74 are well known in the welding art and need not be shown or described in detail to illustrate the invention.

During the downward movement of the reciprocable electrode 15, particularly after the engagement of the articles 10 and 14, it will be noted that through the flexible support of the unit 18 mounted at this position upon the springs 57, the centering of the article 10 upon the article 14 will be brought about, so that uniform welding may be produced throughout the circular area of the engaging portions of the articles.

After the welding operation has been completed, the electrode 15 is moved upwardly, allowing the springs 57 to move their rails 54 upwardly limited by the heads 58 of the elements 55, to again align the upper surfaces of the rails 54 with the upper surface of the rails 50. This action of the rails through the force of the springs 57, moves the electrode 25 free of the base 40. The unit 18 may then be returned to the loading position, carrying with it the welded articles, the electrode 15 having been removed from the article 10 during its upward movement. The welded articles may then be removed from the unit 18 and the process repeated for welding another pair of articles 10 and 14.

Although specific improvements of the invention have been shown and described, it will be understood that they are but illustrative and that various modifications may be made therein without departing from the scope and spirit of this invention as defined by the appended claims.

What is claimed is:

1. A welding apparatus comprising a reciprocable electrode formed to engage a first article which is to be welded to a second article, a base of conductive material, a second electrode formed to receive the second article, rails for supporting the second electrode for movement free of the base between a loading position and a welding position, and means to support certain of the rails adjacent the welding position for movement by the reciprocable electrode for movement of the second electrode into engagement with the base.

2. A welding apparatus comprising a reciprocable electrode formed to engage a first article which is to be welded to a second article, a base of conductive material, a second electrode formed to receive the second article, rails for supporting the second electrode for movement free of the base between a loading position and a welding position, means to support certain of the rails adjacent the welding position for movement by the reciprocable electrode for movement of the second electrode into engagement with the base, and runners carried by the second electrode slidable on the rails.

3. A welding apparatus comprising a reciprocable electrode formed to engage a first article which is to be welded to a second article, a base of conductive material, a second electrode formed to receive the second article, fixed rails disposed adjacent the loading position, movable rails disposed adjacent the welding position and cooperating with the fixed rails for supporting the second electrode for movement free of the base between the said positions, and depressible means for supporting the movable rails for movement thereof with the second electrode by the reciprocable electrode into engagement with the base.

VINCENT G. JARMAN.